United States Patent [19]

Branch, III

[11] Patent Number: 5,113,538
[45] Date of Patent: May 19, 1992

[54] HAMMOCK STAND AND BRACKETS FOR ASSEMBLING SAME

[76] Inventor: Jesse A. Branch, III, P.O. Box 1602, Greenville, N.C. 27834

[21] Appl. No.: 763,205

[22] Filed: Sep. 20, 1991

[51] Int. Cl.$^5$ ............................................. A45F 3/24
[52] U.S. Cl. ............................................. 5/127; 5/120; 403/171; 403/205
[58] Field of Search ............. 5/127, 128, 129, 120, 5/121-126, 282.1; 403/171, 176, 170, 205, 403

[56] References Cited

U.S. PATENT DOCUMENTS

| | | | |
|---|---|---|---|
| 2,506,389 | 5/1950 | Samuelson | 403/170 |
| 3,632,147 | 1/1972 | Finger | 403/171 |
| 4,677,805 | 7/1987 | Schleisner | 403/170 |
| 4,737,047 | 4/1988 | Oshita | 403/205 |
| 4,817,359 | 4/1989 | Colonias | 403/170 |

FOREIGN PATENT DOCUMENTS 10668 of 1894 United Kingdom .................... 5/129

*Primary Examiner*—Alexander Grosz
*Attorney, Agent, or Firm*—J. W. Gipple

[57] ABSTRACT

A hammock stand is described which consists of three elongated structural members joined together axially at oblique angles by means of a unique pair of brackets. Stabilizing cross pieces are also attached transverse to the longitudinal axis of the three structural members by means of the pair of brackets.

3 Claims, 2 Drawing Sheets

HAMMOCK STAND AND BRACKETS FOR ASSEMBLING SAME

SUMMARY OF INVENTION

The present invention is directed to a hammock support stand comprising an elongated base member having an elongated upright support member attached by means of a bracket at an oblique angle to each of its ends. Additional base support members are provided and attached transverse to the elongated base member by means of the respective brackets used to connect the two elongated upright support member to the elongated base member. The devise of the invention permits assembly of a hammock support stand using conventional structural members such as timbers.

BACKGROUND OF THE INVENTION

Hammocks are one of the least expensive, oldest, and most convenient of devices for accommodating individuals in a reclining position. Traditionally, hammocks have been strung between trees, upright poles, and other convenient, relatively stable structures. It has frequently developed however, that the very environments which are most desirable and conducive to the use of a hammock, such as the beach or open sunny area of the yard, are generally devoid of suitable structures to which the ends of a hammock can be attached. Accordingly, various devices have been proposed to provide the necessary structure for suspending a hammock from its two ends so that it is maintained in a configuration where it swings freely above the ground. Of necessity such structures must be quite large since they must not only accommodate between their ends the fully extended hammock itself, but also a reasonable length at either end of rope or chain to permit the hammock to assume a comfortable position and swing freely.

Since these devices are of necessity, large and bulky, it is highly desirable that they be capable of being collapsed and shipped in a dissembled configuration. Various devices have been proposed to permit such dissembling such as laminated or interlocking members which can be joined together to form the hammock support structure. It would however, be desirable to provide a system which permits a strong, stable hammock support stand to be quickly assembled using conventional support members such as structural timbers.

Accordingly, it is an object of the present invention to provide a hammock support stand which can readily be assembled using conventional structural members such as large wooden posts.

It is a further object of the present invention to provide a bracket which permits large structural posts to be joined together quickly and easily at the appropriate angle to provide a free standing hammock support stand.

DETAILED DESCRIPTION OF THE INVENTION

In accordance with the present invention a hammock support stand is provided which comprises an elongated base having two elongated upright support members, each of which is attached by means of a bracket at oblique angles to one of the ends of the elongated base member. Each of the brackets consists of two tubular members joined together axially at an oblique angle to form an elbow having two open ends to receive respectfully one end of the base member and one end of one of the upright support members. A flat plate is attached transversely and at right angles to the tubular member forming the bracket which receives the base member to permit an additional elongated member to be attached transverse to the base member to provide standing support for the hammock.

The unique brackets of the present invention which, as a pair, permit rapid and efficient assembly of the hammock support stand of the invention are advantageously constructed of a strong material such as steel and can be configured to accommodate various elongated structural members such as wooden posts. For example, by using elongated tubular members having a square cross section for example and appropriate dimensions, the hammock support stand can otherwise be constructed of conventional four inch by four inch wooden posts. Similarly, tubular members having a round cross section could also be employed to permit the use of round wooden post or large pipes made of similarly strong material. Attachment of the transverse base support members is conveniently accomplished by means of bolts which pass through both the attachment plate and the elongated base member itself.

The present invention in its various forms and embodiments will however, be more fully appreciated by having reference specifically to the drawings which illustrate an embodiment thereof.

Figure 1:
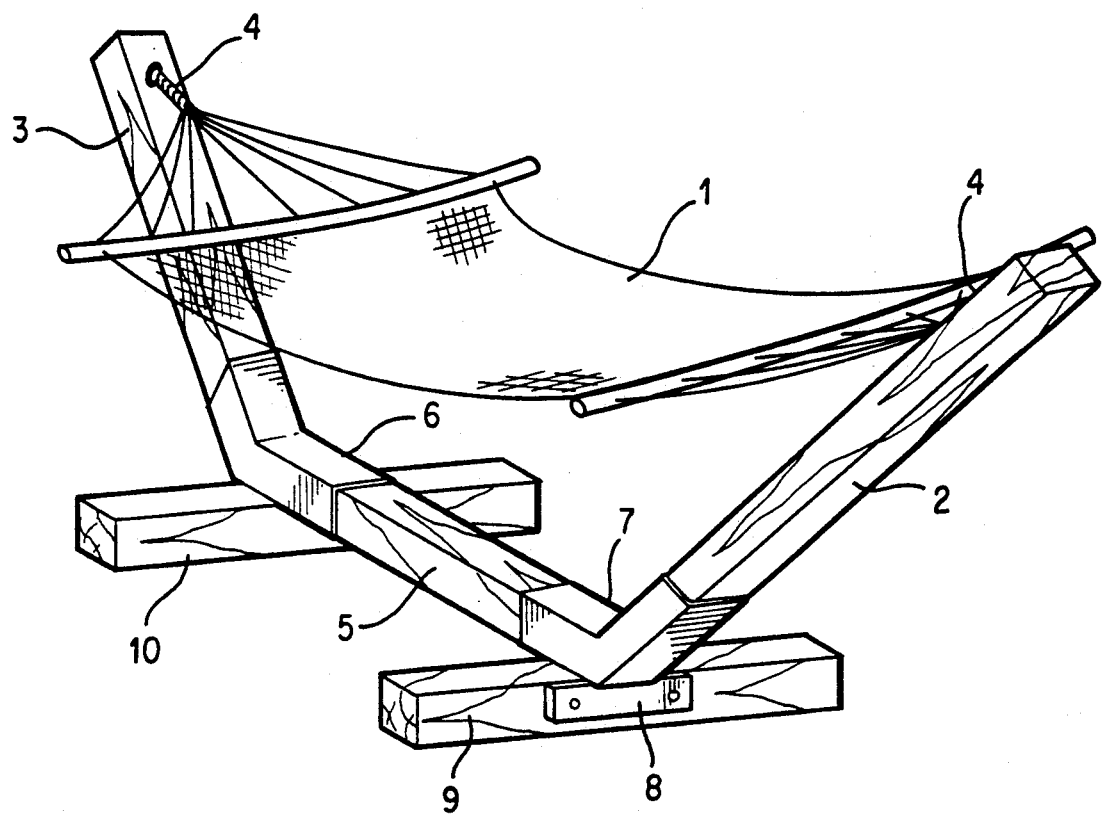
FIG. 1 is a perspective view of the hammock support stand of the present invention in assembled form with a hammock strung between the ends of the support.

Directing attention to FIG. 1 of the drawings, a conventional rope hammock 1 is seen suspended by means of support ropes 4 between two upright support members 2 and 3. The two upright support members 2 and 3 are joined at their respective ends remote from the points of attachment of the hammock to the base support member 5 by means of brackets 6 and 7. A pair of transverse base support members 9 and 10 are also attached by means of the brackets 7 and 6 to the base support member 5. This attachment is accomplished by means of plate 8 which is welded perpendicularly and transversely to the outside bottom leg of each of the brackets 6 and 7.

Figure 2:
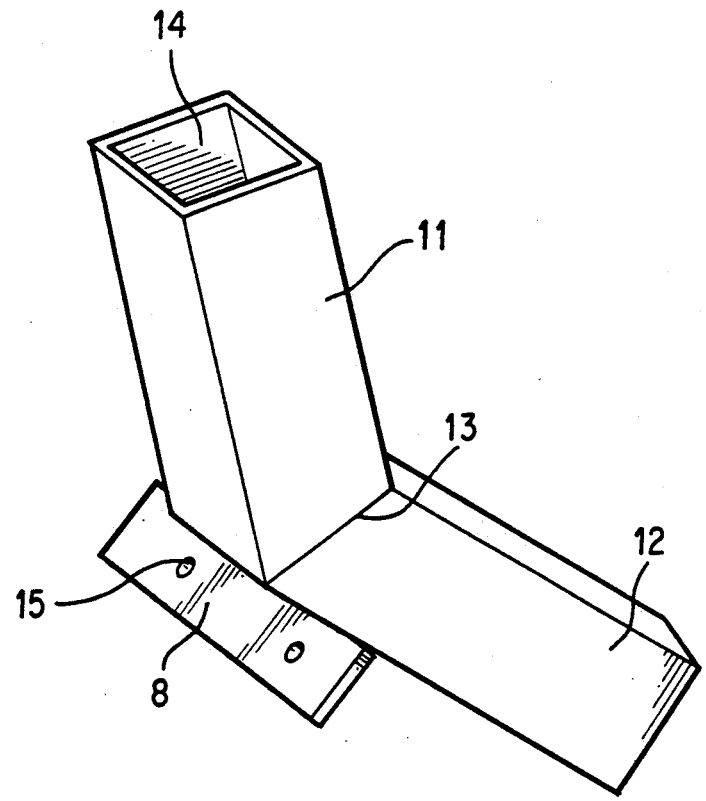
FIG. 2 is a detailed perspective view of the bracket of the present invention.

Directing attention to FIG. 2 of the drawings a more detailed view of the unique bracket of the present invention is illustrated. A pair of elongated tubular members 11 and 12 are joined together at 13 conveniently by being welded in the case of metallic members. A flat plate 8 is similarly attached transversely and at right angles to the outside base of the member 12 proximate the point at which tubular member 12 is joined to member 11. Holes 15 are provided in the plate to accommodate bolts for attachment of the structural base support members.

Figure 3:
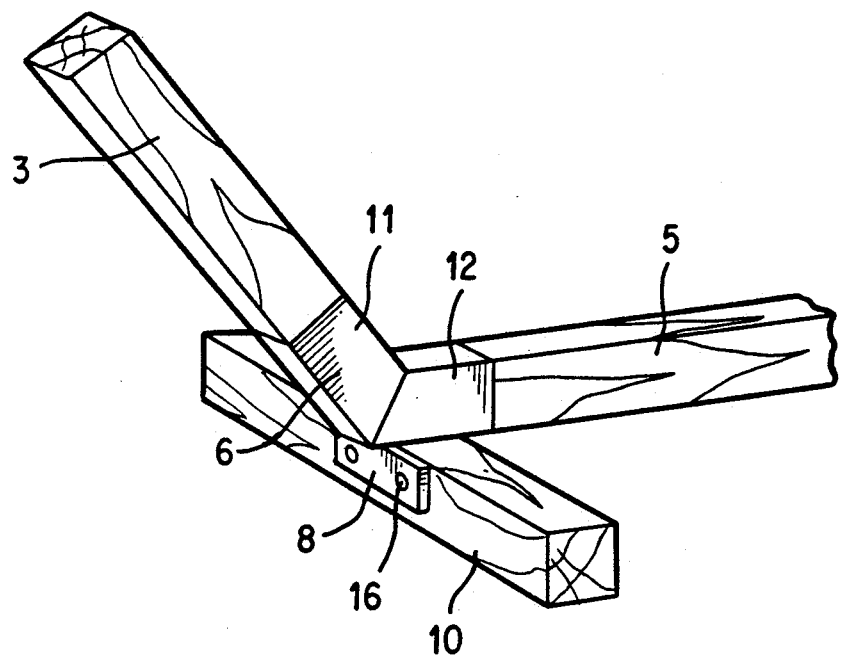
FIG. 3 is a detailed perspective view showing the bracket of the present invention joining together the base member upright support member and transverse support member at one end of the hammock stand of the invention.

Directing attention to FIG. 3 of the drawings, bracket 6 is shown consisting of tubular members 11 and 12 and plate attachment member 8 all joined together by means of the bracket of the invention. Elongated upright support member 3 is inserted into the rectangular open end of member 11 and base support member 5 is inserted into the similarly open end of tubular member 12. Transverse base support member 10 is joined by means of bolt 16 which pass through the holes 15 in the plate and through the base support member 10. In this manner the bracket connecting the respective support members of the hammock stand are jointed together by means of the bracket in a manner which permits a quick and easy disassembly or erection. Further, the weight of the support stand and its occupant is focused by means of the bracket directly on to the two transverse base supports upon which the entire structure rests so that the weight is evenly distributed over a wide area to provide increased stability and support for the structure.

It will be apparent that various materials can be employed both for the support members themselves as well as the brackets, although wooden timbers and relatively heavy gage iron or steel will be seen to be the preferred materials of the invention. It will further be apparent that various alterations in the configuration of both the support members and the bracket can be employed within the scope of the present invention.

What is claimed is:

1. A hammock support stand comprising an elongated base member having an elongated upright support member attached by means of a bracket at an oblique angle to each of its ends, said bracket comprising two tubular members jointed axially at an oblique angel to form an elbow having two open opposing ends to receive respectively an end of said base member and an end of a support member; means for attaching an additional elongated member transversely to the axis of said elbow, said means being attached to one of said tubular members proximate the point at which said tubular members are joined opposite the interior angle of said elbow; and a pair of elongated members each attached transversely to said base member by said attachment means for maintaining said stand in an upright position.

2. The hammock support stand of claim 1 wherein said elongated members are wooden timbers.

3. The hammock support stand of claim 2 wherein said timbers and said tubular members have rectangular cross sections.

* * * * *